United States Patent [19]

Simpson

[11] Patent Number: 4,981,015
[45] Date of Patent: Jan. 1, 1991

[54] BUOYANCY ENGINES

[76] Inventor: Charles E. Simpson, 26822 Cherry Hills Blvd., Suncity, Calif. 92380

[21] Appl. No.: 259,454

[22] Filed: Oct. 17, 1988

Related U.S. Application Data

[63] Continuation-in-part of Ser. No. 132,778, Dec. 14, 1987, abandoned.

[51] Int. Cl.⁵ .................................... F03B 17/02
[52] U.S. Cl. ............................ 60/496; 60/495
[58] Field of Search ............ 60/495, 496; 415/7; 417/337; 290/1 R

[56] References Cited

U.S. PATENT DOCUMENTS 4,054,031 10/1977 Johnson ........................ 60/496
4,363,212 12/1982 Everett ......................... 60/496
4,407,130 10/1983 Jackson ......................... 60/496

Primary Examiner—Stephen F. Husar

[57] ABSTRACT

One or more buoyancy engine units utilizing buoyancy motive force (BMF) are herein defined. For relatively deep fluids a plurality of buckets hinged together mouth to bottom with a gas tight seal between said buckets forming an endless chain can rotate over sprockets attached to parallel shafts spaced apart to control chain tension as either shaft delivers buoyancy motive force (BMF). Each buoyancy engine unit will produce continuous duty rotation and thereby power when the receptacles are alternately filled with gas and then the fluid in which they are submerged.

1 Claim, 1 Drawing Sheet

U.S. Patent
Jan. 1, 1991
4,981,015
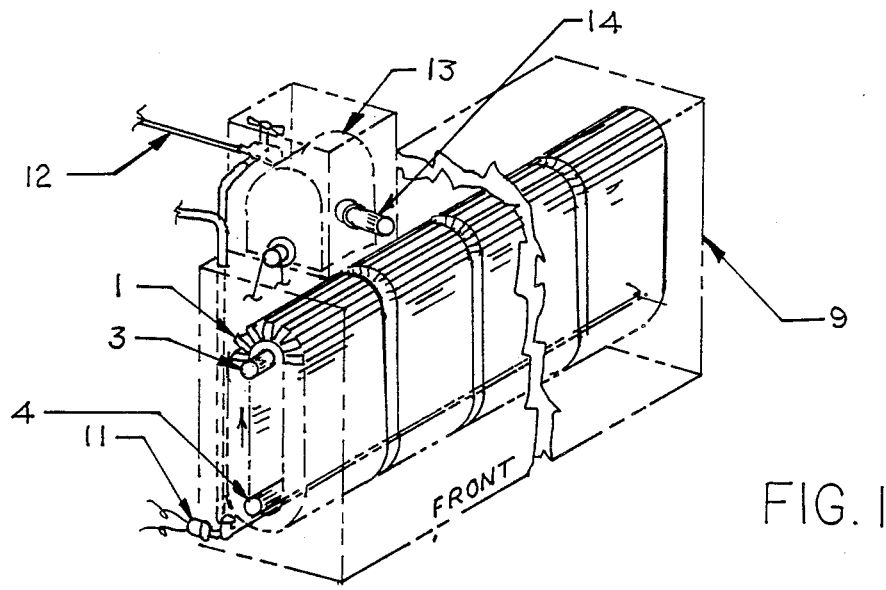
FIG. 1
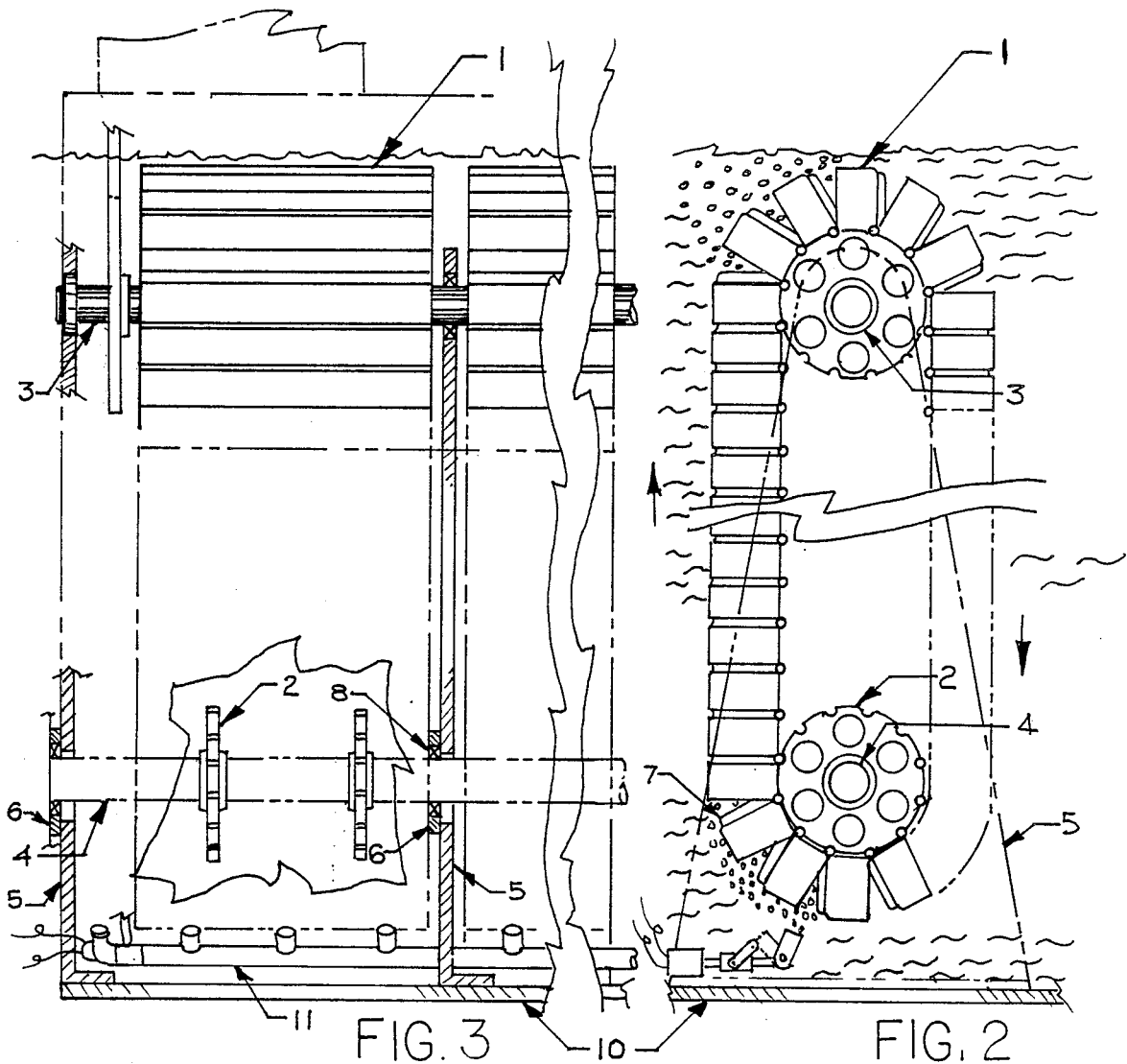
FIG. 3
FIG. 2

BUOYANCY ENGINES

This application is a continuation-in-part of Ser. No. 07/132,778 filed 12/14/87 now abandoned.

THE PRESENT INVENTION

The objective of the present invention is to provide engines which utilize the B.M.F. of deep or shallow open water as well as water in tanks, wells or cisterns. Other fluids may be substituted for the water mentioned and in combination with air or other types of gas, low cost, easy to build and operate, high horsepower engines which do not pollute the atmosphere are available from this invention.

DESCRIPTION OF THE DRAWINGS

FIG. 1 is a schematic perspective of the buoyancy engine assembly for deep water utilization illustrating the preferred embodiments of this invention.

FIG. 2 is the left hand view of FIG. 3.

FIG. 3 is a frontal elevation of the above assembly with portions of the enclosure 9 removed for clarity or shown in phantom.

THE PREFERRED EMBODIMENTS OF THE INVENTION

The embodiment of the invention is illustrated in schematic form by FIGS. 1-3. Virtually any combination of fluids and gases compatible with the materials employed in construction are suitable. The depth of fluid may be relatively deep, however most engine characteristics are designed for finite perimeters of depth, specific gravity of fluid, density and pressure of gas employed, and aforementioned compatibilities of materials.

FIG. 1 a main unit will generally employ a complete system of components including controls such as air input and output engine speed. A plurality of secondary units as denoted in phantom indicates the growth potential for increased horsepower. The various components, output driveshaft, closure compartments when required, and mounting base may be common to all units of a given engine. FIG. 2 depicts an end view of each bucket 1 and its attached seal 7 showing the seals trapping the air in rising buckets once they pass the tangent point of the sprocket. This is accomplished by four or more lugs forming hinges between buckets. FIG. 3 depicts end supports 5 and which support upper shaft 3 and lower shaft 4. Each shaft contains two affixed sprockets 2 and a set of support bearings 8. The volume of each bucket or receptacle, spacing of attaching lugs, and mating sprockets is a function of strength of materials and rigidity required of form, fit, and function.

The lower shaft, in the design shown, has an adjusting plate 6 at each support 5 to assure proper seal squeeze between buckets and to maintain assured chain drive non-slippage.

The directional control of air supply 11 may be adjusted to suit each unit performance.

The actual number and size of each nozzle per unit must be determined by performance and/or efficiency. Electrical controls where depicted may be replaced with mechanical control devices when desired.

Motion and power generated may be transmitted to the engine speed controller 13 via chain belting, or gears as desired. The output drive 14, external air supply 12, and controller 13, may be located to suit.

The water or fluid tight enclosure or contamination screen 9 is optional, unless dictated by actual location environment.

What is claimed is:

1. An apparatus for converting the potential energy of a gas buoyant within a liquid into rotating kinetic energy comprising:
   (a) a housing supporting an upper and lower shaft, said upper and lower shafts immersed within a body of liquid and having at least two upper and lower sprockets mounted respectively on said upper and lower shafts, said lower shaft having an adjusting plate which allows for a vertical adjustment between said upper and lower shafts,
   (b) an endless chain of buckets attached to one another by hinges, said hinges meshing with said upper and lower sprockets, each of said buckets having a seal attached to its base so that when one bucket is vertically disposed above another adjacent bucket a gas tight seal forms between the base of one bucket and the mouth of the other bucket,
   (c) means for injecting a gas into the buckets on said lower shaft so that the liquid in the bucket is displaced by the gas and the buoyant force on the bucket causes the bucket to rise through the liquid and rotate the upper and lower shafts,
   (d) and a power output shaft mechanically connected to said upper shaft.

* * * * *